Patented June 17, 1952

2,600,695

UNITED STATES PATENT OFFICE 2,600,695

PROCESS FOR POLYMERIZING VINYL CHLORIDE

Marcel L. Sans, Venissieux, France, assignor to Societe Anonyme des Manufactures des Glaces et Produits Chimiques de Saint-Gobain, Chauny & Cirey, Paris, France No Drawing. Application July 2, 1947, Serial No. 758,666

3 Claims. (Cl. 260—92.8)

This invention relates to vinyl polymers and particularly to vinyl polymers composed wholly or partly of polyvinyl chloride. This invention is a continuation in part of my prior applications Ser. Nos., 602,679, filed June 30, 1945 now U. S. Patent 2,508,801, and 723,304, filed January 21, 1947, now abandoned.

I have invented certain polymers of vinyl chloride and certain copolymers of vinyl chloride that are possessed of superior qualities. These polymers are characterized by a high degree of polymerization, by high purity, by excellent dielectric properties, and by extraordinary heat stability. These new compounds are made by a new process which makes possible bulk polymerization of vinyl chloride, the production of a homogeneous powder without the crushing and grinding that has heretofore been considered necessary, and the production of this powder in selected particle size without crushing or grinding even when a copolymer is made.

It is a major object of this application to describe these new vinyl polymers and copolymers and to set forth a method by which they may be successfully prepared. In considering the invention it should be kept in mind that the results obtained are secured by a process that is a combination of steps, several of which are individually new and capable of contributing increments of improvement to other processes and therefore having inventive novelty in themselves.

The primary raw material involved in the invention is vinyl chloride, but the invention also extends to the polymerization of mixtures of vinyl chloride with other polymerizable materials such as vinyl acetate, acrylic esters, and fatty acids and their salts, particularly the unsaturated fatty acids.

A characteristic of the new invention is the employment of a catalyst of the peroxide-persalt class, called peroxides herein the outstanding examples of which are the organic peroxides, the persulfates, and the perborates. The amount of catalyst is such that the free oxygen does not exceed .015% of the weight of the monomer. Such an amount produces an unsatisfactory commercial yield except for the step of the process which includes in the reaction mass a salt of a strong base and a weak acid, in a small amount, examples of which are the alkali salts of weak acids and the salts of carboxylic acids such as the cadmium, zinc and lead salts thereof. It is preferable to carry out the polymerization in most instances in the presence of a small quantity of a weak acid or an anhydrid thereof. The reaction is preferably carried out in the absence of solvents or diluents.

A phase of the invention particularly valuable in the making of copolymers includes the regulation of the period of polymerization.

In order to demonstrate various phases of the invention a number of examples are given hereinafter which have been selected because they demonstrate in a clear and comprehensible manner the nature of the invention, the efficacy of a particular step, or the beneficial results as embodied in new and superior products. It must be remembered, however, that these examples are for illustrative purposes, are not limitations, and that while they furnish evidence to support the general description, they are not the only evidence that is available, or which can be furnished to support the application. It is not the function of the examples to duplicate statements found in the more general portion of the specification, nor is it the function of the general portion of the specification to duplicate material sufficiently set forth in the examples. In carrying out the polymerization, excellent results were obtained by a special autoclave having rotary stirrers of which an inner blade moves the polymerization mass out toward the wall of the autoclave and a following, outer blade moves the part of the polymerization mass that is against the wall inward away from it, thus mixing and moving part of the mass to a place of lower temperature and immediately thereafter moving it away therefrom.

The catalysts used are from the peroxide-persalt class notable among which are the organic peroxides and the salts such as persulfates and perborates. A standard catalyst of this class is benzoyl peroxide which is available on the market at reasonable cost, is of excellent efficacy, and is usually employed. It will be referred to in the following examples, but it is to be understood that this particular reference is not a limitation but is adopted in order to keep the conditions and reagents as uniform as possible throughout the examples in order to demonstrate the effect produced by certain variations in process. Heretofore in order to obtain good results from polymerization, it was necessary to employ comparatively large amounts of catalyst. For example, when polymerizing vinyl chloride it was necessary to employ a catalyst of the peroxide-persalt class having an active oxygen content on the order of .04% of the weight of the monomer and frequently even more. That process had adequate difficulty when ordinary processes of polymerization were employed, but when it was attempted to undertake bulk polymerization it was found that the reaction was accompanied by local overheating, by extreme violence in the reaction, or on the contrary its actual arrest, and that under some conditions a solidification of the reaction mass occurred. In order to overcome those inconveniences it was proposed to carry out the reaction by heating at slowly increasing temperatures, or to arrest the reaction when there still remained a considerable fraction of the monomer to be polymerized, or still further, to operate in the presence of important quantities of solvents or diluents. Such methods did not produce wholly satisfactory results and the best products that could thus be produced could not be heated to a temperature of 190 to 200 degrees C. without disintegrating. Furthermore, they were generally of comparatively low degrees of polymerization, and when made, were not made in bulk.

According to this invention, I employ an amount of peroxide-persalt catalyst containing less than .015% free oxygen based on the weight of the monomer, an amount which is insufficient to give an acceptable commercial yield by the process of the prior art. With this amount of catalyst I employ a substance capable of fixing any acid released during polymerization or aging or decomposition by precipitation, by neutralization, or by neutralization and precipitation. The amount of catalyst preferably employed contains about .005% of the weight of the monomer in free oxygen and a small amount of acid fixing substance. The acid fixers or stabilizers are preferably the salts of strong bases and weak acids, such as the alkali salts of weak acids, particularly, when organic salts are employed the salts of unsaturated organic acids, of which trisodium phosphate is an excellent example, and the salts of carboxylic acids, such as oleic, acrylic, linoleic, particularly the heavy metal salts thereof such as cadmium, zinc, and lead. The acetates of such salts are particularly convenient. When benzoyl peroxide is employed a quantity equal to .08% of the monomer produces a satisfactory quantity of free oxygen. In addition to the acetates, the oxalates and formates are also useful and are readily available.

In carrying out the reactions with the small quantity of catalyst plus the stabilizer, it is now possible, even when operating in bulk, to carry the temperature of the reaction to a relatively high level immediately and to maintain it at that level throughout the operation. For example, temperatures on the order of 30 to 70 degrees C. have been successfully used under various conditions. Thus operating, polymerizations from 85% complete to wholly complete have been carried out in periods of time from 13 to 48 hours, which shows a reduction in time of treatment for given cases of 50% or more.

In order to further facilitate the process, it is advisable to add to the reaction an activator from the class of weak acids and their anhydrids. It has hereinabove been pointed out that the acid released by decomposition of the monomer or polymer is harmful. It is therefore astonishing that the presence of an additional quantity of acid should not be harmful. Nevertheless, this is the fact and it is part of my invention to add a small quantity of such an activator to the reaction. Their presence reduces the time of polymerization when the amount of catalyst set forth hereinabove is employed or it permits one, by using the same periods of time, to further reduce the amount of catalyst. It is advisable to incorporate the monomer, the catalyst, and the stabilizer thoroughly and to heat them until they are under pressure before adding the activator.

The polymerization of vinyl chloride and its copolymers begins not with an immediate setting but with a period of induction in which no observable change takes place in the monomer and which is followed by a period of active transformation to the polymeric state. The period of induction is short or long, depending upon the nature of the monomer and the conditions under which it is polymerized, but in each instance there is a natural duration of the period of induction and of the period of active polymerization which is, in the case of vinyl chloride particularly, quite extensive. The difference between the rate of polymerization of vinyl chloride and, for instance, vinyl acetate is very great so that when they are polymerized together polymerization does not proceed evenly to a common end point, but at different rates to different end points which may be many hours apart. This complicates the process of making copolymers, and the products produced are of a grade much inferior to those that are produced by this invention. For these reasons and others, it is desirable to regulate the duration of the period of induction and to regulate the duration of the period of polymerization of compounds that are to be copolymerized so that they may be brought to approximately a single end point and thus made to contribute valuable qualities to a superior product. Thus, taking any two vinyl compounds that are to be copolymerized and which polymerize at different rates, it is desirable to selectively slow down the rate of polymerization of the one which polymerizes fast and to hasten the polymerization which proceeds more slowly. This action should be selective, either one or the other being applicable, or both acceleration and slowing may take place together.

The quantity of catalyst present in this invention is so small that any material added for the purpose of accelerating or slowing the period of induction, the period of active polymerization, or both, must be inert to the catalyst and must not interfere with the operation of the stabilizer. Heretofore, attempts have been made to reduce the period of induction and the total period of polymerization, or to extend it, but so far as known, every additive of this type has had an undesirable effect upon the catalyst.

Not only is it desirable to accomplish speed control of the polymerization of mixed monomers, but it is desirable to be able to have control of the period of induction, the period of active polymerization, and the total period of polymerization where single monomers are in process.

In order to reduce the total duration of an operation or to further reduce the quantity of catalyst while employing the same duration, the vinyl compounds are passed in monomeric form and in gas phase over active carbon heated to temperatures between 30 and 80 degrees C. prior to polymerization. The following examples illustrate this phase of the invention.

*Example 1*

250 kg. of vinyl chloride monomer were treated with 20 kg. of active carbon at 45 degrees C. and then mixed with 1 kg. of acetic acid, 2 kg. of lead acetate, and 150 grams of benzoyl peroxide and heated to 55 degrees C. in the special autoclave. After 13¼ hours the rate of polymerization was 50%, giving an hourly rate of 4.35%. The product had a specific viscosity of 1.90. The product was an excellent fine powder.

*Example 2*

250 kg. of vinyl chloride were treated with the same active carbon as in the preceding example at a temperature of 40 degrees C. and mixed with 2 kg. of acetic acid, 2 kg. of lead acetate, and 150 grams of benzoyl peroxide and heated at 55 degrees C. for 19 hours, 10 minutes, after which the polymerization was 85.8% complete, representing an hourly rate of 4.9%. The product had a specific viscosity of 1.85 and was in the form of a good powder.

*Example 3*

250 kg. of vinyl chloride were treated as in the two preceding examples at a temperature of 45 degrees C. It was then mixed with 1 kg. acetic acid, 2 kg. lead acetate, and only 100 grams of benzoyl peroxide, which is only .04% of the monomer. The mass was heated at 55 degrees C. for 18 hours after which the extent of polymerization was 72%, representing an hourly rate of 4%. The powder obtained was fine and without lumps.

*Example 4*

250 kg. vinyl chloride were passed over active carbon under the conditions provided and were polymerized with the assistance of 100 grams (.04%) of benzoyl peroxide. A fine powder was obtained which, after working in a roll mill, remained 8 minutes at 190 degrees C. under 250 kg. of pressure without decomposition, whereas .08% of benzoyl peroxide was required to produce the same yield in the same time according to the methods of the prior art, and the product thus produced by the prior art methods was worked up in the roll mill, but was stable for only two minutes under the said conditions.

It is apparent from the foregoing examples that in spite of the small quantity of catalyst a high hourly yield is obtained of a fine powderous product. It is also apparent that the duration of heating is reduced. On the other hand, the process permits a material reduction in the quantity of catalyst.

The new products that are produced by this invention are superior in many ways, but possibly their most outstanding quality is their heat stability. Similar products made by the process of the prior art are not stable under identical circumstances for more than 1 or 2 minutes at a maximum. The process itself has the advantage that the heating can be vigorously commenced at the most favorable temperature from the beginning of the reaction without danger of the reaction proceeding too violently and producing degraded products.

Another advantage is that there is directly obtained a polymerized product that is substantially free of residual catalyst and is consequently purer and better. Only small quantities of additional substances are employed to fix the acid disengaged during the reaction and some of these remain in the reaction mass and are capable of fixing any products of decomposition that may be formed during use. The reaction is calmer than those which have been previously known and is under better control than has ever been possible heretofore. The finished products are purer and are more resistant to chemical agents than the prior art products. They have excellent dielectric qualities.

The polymers of the invention have a molecular weight between 50,000 and 90,000 by the viscosimetric method.

The process is particularly advantageous in that the necessity of grinding a solid or lumpy product to produce a powder is totally eliminated and a powder or a product of given particle size can be produced at will in a special autoclave. This advantage is particularly noted in the case of copolymers which have heretofore had a pronounced tendency to form into aggregates in the reaction vessel. Another particular advantage is that the bulk polymerization of vinyl chloride and its copolymers can be carried out, which was heretofore believed to be impractical.

As many widely different embodiments of the present invention may be made without departing from the spirit and scope thereof, it is to be expressly understood that the same is not limited to the specific embodiments, except as defined in the appended claims.

What is claimed is:

1. The method of making vinyl polymers that includes the steps of passing vinyl chloride in gas phase over active carbon, heating the vinyl chloride in confinement in the absence of solvents and diluents to a mean temperature in the range 30–70° C., for not materially more than 48 hours while mixing it and moving portions of it to a place of lower temperature and immediately away from said place into the mass again in the presence of a peroxide catalyst containing not over .015% of the weight of the monomer of free oxygen, and of a stabilizing amount of a salt of an acid capable of reacting with HCl.

2. The method of claim 1 in which the stabilizer is one of the group consisting of trisodium phosphate, lead acetate, and sodium acrylate.

3. The method of regulating the speed of polymerization of vinyl chloride that includes the step of passing the monomer in gas phase at about 30 to 80 degrees C. over active carbon.

MARCEL L. SANS.

REFERENCES CITED

The following references are of record in the file of this patent:

UNITED STATES PATENTS

| Number | Name | Date |
|---|---|---|
| 1,920,403 | Klatte et al. | Aug. 1, 1933 |
| 1,997,145 | Herbert | Apr. 9, 1935 |
| 2,122,805 | Wulff et al. | July 5, 1938 |
| 2,157,997 | Brous | May 9, 1939 |
| 2,218,645 | Japs | Oct. 22, 1940 |
| 2,365,400 | Fikentscher | Dec. 19, 1944 |
| 2,365,506 | Alexander | Dec. 19, 1944 |
| 2,387,571 | Fikentscher | Oct. 23, 1945 |
| 2,406,403 | Rogers | Aug. 27, 1946 |
| 2,412,504 | Goldfinger | Dec. 10, 1946 |
| 2,423,388 | Jordan | July 1, 1947 |
| 2,508,801 | Sans | May 23, 1950 |

FOREIGN PATENTS

| Number | Country | Date |
|---|---|---|
| 2,627 | Australia | of 1926 |

OTHER REFERENCES

Brajnikoff: Plastics (London), March 1942, pp. 72–78.

Houwink: "Chemie Und Technologie Der Kunstuff," vol. II, page 130 (Edwards Bros., 1942).